United States Patent [19]

Charbonneau et al.

[11] Patent Number: 5,000,040

[45] Date of Patent: Mar. 19, 1991

[54] METHOD AND APPARATUS FOR REMOTE MONITORING OF VALVES AND VALVE OPERATORS

[75] Inventors: Arthur G. Charbonneau, Marietta; Stanley N. Hale, Rome; Edmond A. Sayed, Marietta, all of Ga.

[73] Assignee: Movats Incorporated, Marietta, Ga.

[21] Appl. No.: 446,985

[22] Filed: Dec. 6, 1989

Related U.S. Application Data

[63] Continuation of Ser. No. 278,977, Dec. 1, 1988 now U.S. Pat. No. 4,891,975, which is a continuation of Ser. No. 848,451, Apr. 4, 1986, Pat. No. 4,831,873.

[51] Int. Cl.[5] ............................................. G01M 19/00
[52] U.S. Cl. ..................................................... 73/168
[58] Field of Search ................ 73/168, 862.27, 862.28, 73/862.31, 862.32; 137/551; 251/129.11, 129.12; 318/729; 324/127, 142, 158 MG

[56] References Cited

U.S. PATENT DOCUMENTS

| 4,029,122 | 6/1977 | Jaegtnes | 137/551 |
| 4,123,009 | 10/1978 | Kilpinen | 241/30 |
| 4,321,529 | 3/1982 | Simmonds et al. | 324/83 R |
| 4,333,118 | 6/1982 | Comstedt et al. | 361/30 |
| 4,542,649 | 9/1985 | Charbonneau et al. | 73/168 |
| 4,551,808 | 11/1985 | Smith et al. | 364/474 |
| 4,570,903 | 2/1986 | Crass | 251/129.12 |
| 4,831,873 | 5/1989 | Charbonneau et al. | 83/168 |
| 4,891,975 | 1/1990 | Charbonneau et al. | 73/168 |

Primary Examiner—William A. Cuchlinski, Jr.
Assistant Examiner—W. Morris Worth
Attorney, Agent, or Firm—Louis T. Isaf

[57] ABSTRACT

A method and apparatus for providing a previously unattainable yet desirable function of monitoring at a remote location and/or in a remote (non-intrusive) manner the condition of a valve operator to signal a need for more thorough inspection and for possible maintenance of the valve or valve operator; the method and apparatus including the relating of power parameters such as motor power and motor power factor to the valve operator stem load, setting up a control value for the power parameter based on a maximum allowable operator thrust depletion; and periodically monitoring actual power parameter values at a remote location for comparison to the control value.

5 Claims, 3 Drawing Sheets

METHOD AND APPARATUS FOR REMOTE MONITORING OF VALVES AND VALVE OPERATORS

This application is a continuation of application Ser. No. 278,977, filed Dec. 1, 1988, now U.S. Pat. No. 4,891,975, which is a continuation of Ser. No. 848,451, filed Apr. 4, 1986, now U.S. Pat. No. 4,831,873, issued May 23, 1989.

FIELD OF THE INVENTION

This invention relates generally to the field of testing and diagnosis of valve operators and, more specifically, to a method and apparatus for remotely testing the condition of a value operator.

BACKGROUND OF THE INVENTION

Within the power industry, valves are operated remotely from open, closed and intermediate positions to improve or maintain utility power plant output, or in many cases to provide for the protection of the general public from release of radioactive materials either directly or indirectly. Continual, proper operation of these valves is essential to the well-being of the industry and the general public. The extreme emphasis on safety in nuclear power plants (and the presently bad reputation of the nuclear industry) has put a premium on the importance of maintaining proper operation of valves, of which there may be hundreds within a single plant.

At the forefront of industry attempts to monitor and maintain proper operation of these critical valves is the recent invention of Arthur G. Charbonneau, et al described in U.S. Pat. No. 4,542,649 (herein referred to as "649"). The 649 invention disclosed a new and important valve operator monitoring system to measure, record and correlate valve stem load, limit and torque switch positions, spring pack movement and motor current, providing time related information on valve performance. The information made available by the 649 patent provides a direct indication of developing valve and operator problems, such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation.

Specifically, the "649" invention accomplishes monitoring of valve operator parameters by direct signal and equipment measurements taken at the location of the valve or valve operator. A user must venture to the location of the valve/valve operator and take direct measurements for monitoring purposes. More and more demand is being made by government and other agencies for a system which can monitor a valve condition from a remote, meaning distant, location, i.e. the power plant operation center or Master Control Center. Neither the "649" invention nor other known prior art provides a reliable system for accomplishing such remote monitoring.

Moreover, prior art valve monitoring is typically accomplished during no-flow conditions and requires at least minor, temporary modification of the valve operator. In nuclear power plants, if not also other facilities, testing equipment which is intrusive, meaning it in any way modifies the valve operator or its circuitry, can not be left connected during valve-in-use conditions. Thus, typical prior art monitoring and testing is under no flow conditions with operation of the plant or valve sector closed down. Thus, a need exists for non-intrusive (and, thus, "remote") systems for monitoring the condition of the valve operator during actual valve-in-use conditions to signal the need for more extensive testing or maintenance of the valve or valve operator.

SUMMARY OF THE INVENTION

Briefly described, the present invention is unique in its discovery and utilization of a valve operator parameter measurable from a remote location, which discovered parameter is a reliable indicator of valve operator condition. The system of the present invention comprises method and apparatus: for simulating an operation impairing load on the valve operator; for measuring a power related parameter, such as motor input power or "power factor", which parameter is readily measured at the remote location; for correlating the power parameter and the operator stem load; for calibrating and establishing a control value of the power parameter, which control value is directly related to the operation impairing stem load; for periodically and remotely monitoring the power parameter during daily, in-use operation of the valve operator; and for generating and recording actual in-use values of the power parameter for comparison with the control value to signal an actual operation impairing condition at the valve operator.

The apparatus of the present invention includes a dynamic load simulator for controllably and accurately simulating a load on the valve stem of a valve operator. The apparatus further comprises devices for monitoring the valve operator thrust load and for non-intrusive monitoring of the power and/or power factor associated with the valve operator motor.

Thus, it is an object of the present invention to provide a method and apparatus for monitoring the condition of a motor operated valve from a "remote", meaning removed in space, master control center of a power plant.

Another object of the present invention is to provide a method and apparatus for monitoring the condition of a valve, while the valve is in use, in a manner which is "remote", meaning it is non-intrusive.

Another object of the present invention is to provide a system (method and apparatus) which provides a remote observer of the valve with a manner for remotely determining if the thrust available within the valve operator to close/open the valve has been adversely reduced so as to render the valve in need of maintenance.

Yet another object of the present invention is to provide for permanent storage of power or power factor signatures relating to a valve operator which can be analyzed and compared to simultaneous thrust load signatures of the same operator for the purpose of relating a maximum allowable power or power factor to an adversely reduced thrust capability of the operator.

Other objects, features and advantages of the present invention will become apparent upon reading and understanding the specification when taken in conjunction with the accompanying drawings.

DETAILED DESCRIPTION OF THE PREFERRED EMBODIMENT

Figure 1:
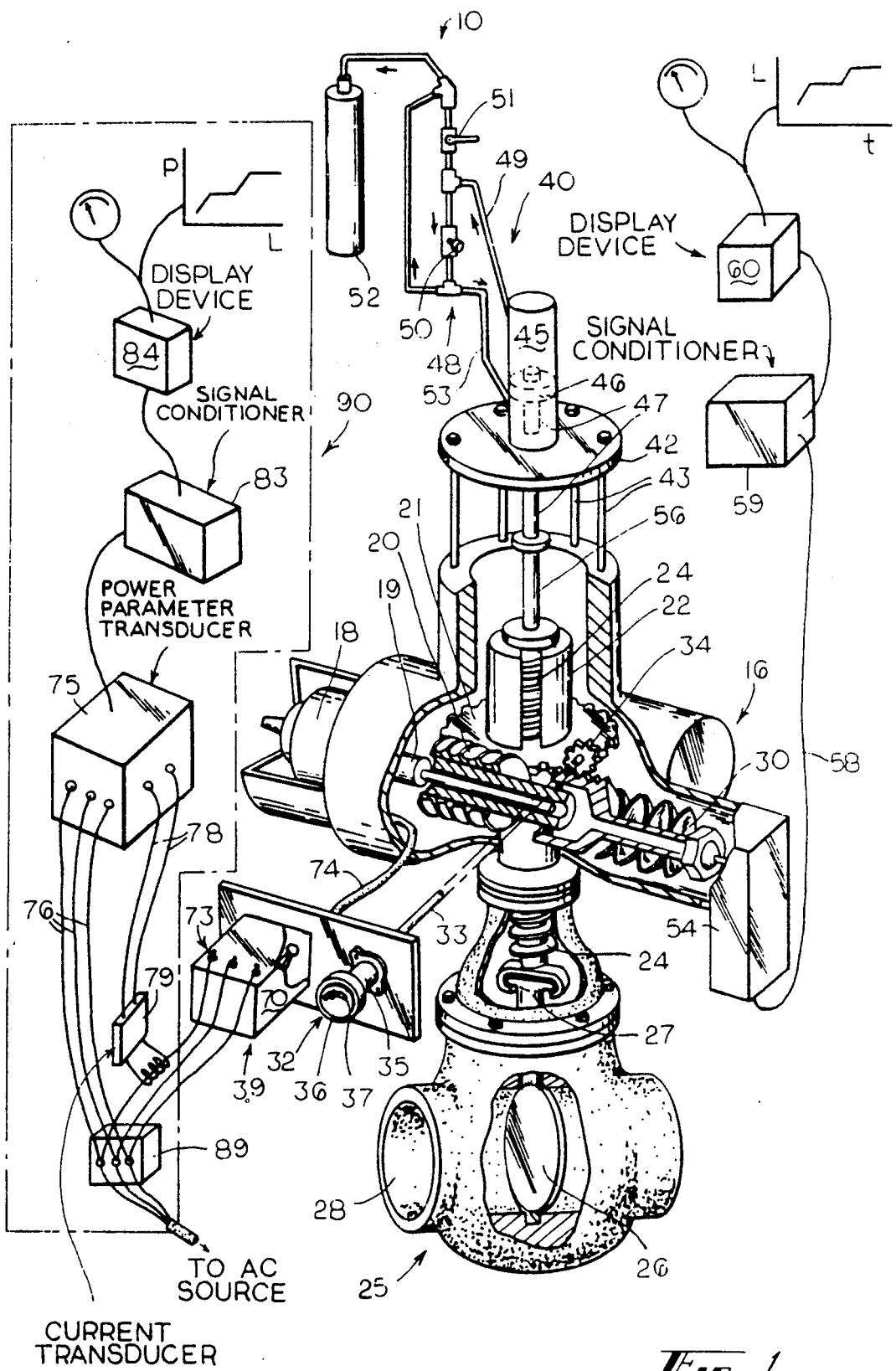
FIG. 1 is a pictorial representation, with parts broken away and parts isolated, of the Valve Operator Remote Monitoring System in accordance with the present invention, shown outfitted in the calibration mode.

Referring now to the drawings, in which like numerals represent like components throughout the several views, FIG. 1 shows the Valve Operator Remote Monitoring System 10 of the present invention outfitted for its calibration mode. A valve operator 16, of a type typically used in the art, is shown as having a motor 18 which drives a worm shaft 19, which in turn drives a worm 20, which in turn drives a worm gear 22. The worm gear 21 is formed with a drive sleeve 22 into which is inserted and to which is splined a drive nut (not seen). The internally threaded drive nut drives an externally threaded valve stem 24. The valve stem 24 engages valve shaft 27 to open or close the valve element 26 of the valve assembly 25. In order to absorb the rotating inertia of the motor 18 and other operator components, a cluster of compression springs or spring pack 30 is provided at one end of the worm shaft 19. A torque switch assembly 32 is seen as connected by a post 33 to a spur gear 34 for movement in relation to the worm 20. The torque switch assembly 32 is of a type typical in the industry and generally includes a switch chamber 35 which houses an electrical/mechanical torque switch (not seen), a face plate 36 and switch setting screws 37 at the face plate.

The valve assembly 25 which is preferably operated on by the system of the present invention is a gate valve of the type typically known in the industry. Gate valve assembly 25 includes a gate element 26 which is moved up and down perpendicular to the fluid flow through the piping 28.

The present invention includes a dynamic load simulator 40 Mounted to the valve operator 16 above the valve stem 24. The dynamic load simulator 40 comprises a plate member 42 rigidly supported above the operator body 16 by threaded posts 43 which are threaded into existing screw holes of the operator. Mounted above the plate member 42 is an hydraulic cylinder 45. The cylinder piston rod 47 protrudes through a central opening in the plate number 42 and extends below the plate member. A tubing network 48 communicates among the upper and lower sectors of the cylinder 45 and an accumulator 52. Within the tubing network is provided a hand operated flow adjusting valve 50 and a flow directing valve 51.

The apparatus of the present invention further comprises a load measuring device 54. In the embodiment of FIG. 1, the load measuring device 54 is shown as being in the form of the spring pack movement measuring device 54 as disclosed in the Charbonneau 649 Patent. U.S. Pat. No. 4,542,649 is, by this reference, made a part hereof, and operation of this spring pack movement measuring device is as described therein. The spring pack movement measuring device 54 determines thrust load values by relating actually measured spring pack movement to the thrust load. The output signal of the load measuring device 54 is directed by signal cable 58 to a signal conditioner 59 and then to a display Device 60. The signal conditioner 59 provides a conditioned power supply for the LVDT of the load measuring device 54 and provides necessary sub-components for generating and delivering the output signal to a display device 60, such as an oscilloscope, meter or other such device 60.

Shown housed within the control box 39 of the operator 16 is a power terminal assembly 70. 3-phase power, typically 480 volts, is directed from an AC power source by power cables 71, 72, 81 to the 3-phase power terminals 73. From the 3-phase power terminals, the power is directed to the motor 18 through the motor cable 74. The forestated power connections are accomplished in an manner typically known in the industry. The three power cables 71, 72, 81 are seen as eminating from master control terminals 89 located within the master control center 90 of the power plant. In this embodiment of FIG. 1, a power parameter transducer 75 is shown with input leads 76 connecting (i.e. by simple allegator clips) to each of the 3-phase master control terminals 89. The power parameter transducer 75 is also seen as connected by leads 78 to a current transducer 79. The current transducer 79 is clamped around one power cable 81 at the master control center 90. The power parameter transducer 75 is either a power transducer or a Power Factor transducer, depending upon the parameter selected, and is connected in a manner typically known.

Figure 3:
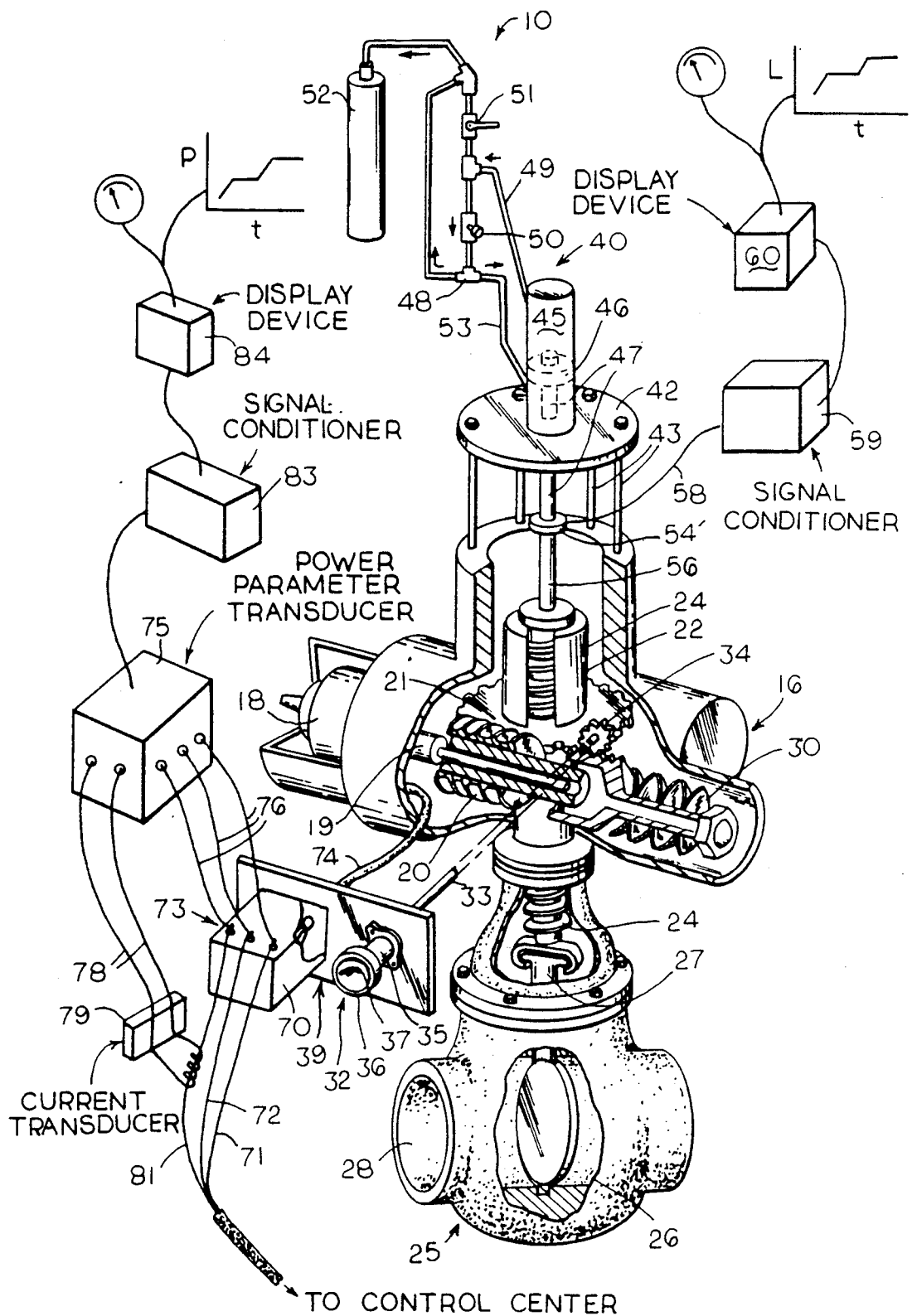
FIG. 3 is a pictorial representation, with parts broken away and parts isolated, of the Valve Operator Remote Monitoring System in accordance with the present invention, shown outfitted in the calibration mode, and showing an alternate embodiment to that of FIG. 1.

An alternate embodiment of the apparatus of the present invention is shown in FIG. 3. In this embodiment, the load measuring device 54 comprises a load cell 54' mounted to the lower end of the piston rod 47. Resting on top of the valve stem 24, in communication between the valve stem 24 and the lower surface of the load cell 54 is a valve stem extension 56.

The load cell 54' is connected by signal conducting cable 58 to the signal conditioner 59. The purpose of the signal conditioner 59 is to provide a conditioned power supply for the load cell 54; and to provide necessary sub-components for generating and delivering the output signal to the display device 60.

In accordance with an alternate embodiment of the present invention, as depicted in FIG. 3, the power parameter transducer 75 is shown with leads 76 connecting (i.e. by simple allegator clips) to each of the three-phase power terminals 73 at the operator control box 39. The power parameter transducer 75 is also seen as connected by lead 78 to a current transducer 79. The current transducer 79 is clamped to one input cable 81. In still other alternate embodiments, a separate current transducer 79 is clamped to each of the three input cables 71, 72, 81. The power parameter transducer 75 is connected at its output to a signal conditioner 83 which is connected to a display device 84.

Although the present invention is not to be limited hereby, the following are example specs of some of the more important system components:

the operator 16 - Limitorque ® SMB OO.
Valve assembly 25 -- 3" gate valve.
Spring Pack Movement Monitoring device 54 - MOVATS 2100
load cell 54 - 50,000 lb. rated load
operator motor 18 - 480 v, 3-phase, 3 wire
power parameter transducer 75 - AEMC model S22904 Chart recorder with power factor transducer and with power transducer.
Current transducer 81 - FLUKE model Y 8100
Signal conditioners 59 and 83 - MOVATS 2100

Recording devices 60 and 84 - NICOLET 3091

Operation. By following the below outlined procedures, the Valve Operator Remote Monitoring System 10 of the present invention can be utilized to monitor a valve operator 16 from a remote control center (i.e. master control center 90). The method of the present invention will assist the user in recognizing that a valve operator positioned in a remote location is jammed, over packed, damaged or otherwise malfunctioning. The determination of a valve malfunction in accordance with the present invention, is determined as a condition in which the valve thrust available to the valve operator has reached an unacceptable low level. This unacceptable low level of available thrust is, for purposes of the present invention, defined as the "minimum thrust" which the user deems necessary for the valve operator 16 to properly open and close the valve 26. This minimum thrust value is typically calculated or otherwise determined by an engineer, power plant administrator, the user or other competent party. One method of determining the minimum thrust is to calculate the thrust required to overcome the maximum $\Delta P$ (pressure differential) of the valve and then increase that thrust by a margin of safety (i.e. 25%), using the resulting figure as the "minimum thrust".

The method of the present invention is generally performed as follows:

1. The user assures that the torque switch 32 setting of the operator 16 which is to be monitored is properly set. It is the purpose of the torque switch setting to automatically cut off the motor 18 when the valve operator torque (and, thus, thrust load) has exceeded a predetermined maximum. The setting and verification of the torque switch setting are accomplished, preferably, in accordance with the methods of the Charbonneau 649 Patent.

2. The user determines the value of the "minimum thrust", as discussed above.

3. The valve operator is outfitted with the system apparatus of the present invention in the manner described above in relation to FIG. 1 (and FIG. 3). With the system apparatus 10 outfitted as per FIGS. 1 and 3, the system is in the calibration mode. Calibration of the remote monitoring system 10 of the present invention is accomplished as follows:

a. The valve operator motor 18 is turned on and the operator is set to open the valve gate 26. With the operator in this open-valve mode, the driven valve stem 24 begins to move upward pushing against the valve stem extension 56 of the dynamic load simulator 40. Upward movement of the valve stem extension 56 compresses the piston rod 47 into the hydraulic cylinder 45.

b. Movement of the cylinder piston 46 and thus piston rod 47 is controlled by the tubing and valve network which comprises tubing 48, flow adjusting valve 50, flow directing valve 51 and accumulator 52. By closing the flow directing valve 51 (as seen in FIGS. 1 and 3), fluid escaping from the hydraulic cylinder 45 through upper cylinder tube 49 is forced to flow past the flow adjusting valve 50 after which the fluid flows partially back into the cylinder 45 at lower cylinder tube 53 and also flows into the accumulator 52. (See arrows of FIG. 1.) It can be seen that, by adjustment of the flow adjusting valve 50, the "bleed" of fluid from the cylinder 45 can be controlled. Thus, the force exerted by the valve stem 24 on the valve system extension 56 or piston rod 47 can be likewise controlled.

c. Using the dynamic load simulator 40 and its flow adjusting valve 50, the user simulates a load on the value stem 24. The simulated load simulates a blockage, warpage, excessive packing load, or other stressful condition of the valve operator. The load which the user will simulate is preferrably a load which will deplete the available operator thrust to a level which is equal to the "minimum Thrust" deemed necessary for proper opening and closing of the valve, as determined at step 2 above. As clarification: the maximum available thrust is that maximum thrust which the operator 16 can deliver before the torque switch 32 is tripped., the minimum required thrust is that determined at step 2 above; and, thus, the simulated load to be created by the dynamic load simulator 40 would be equal to: the maximum available thrust minus the minimum required thrust.

d. Whereas the dynamic load simulator 40 is used to generate the simulated load, the simulated load is measured at the load measuring device 54. In the embodiment of FIG. 1, measurement of the simulated load is accomplished through the use of a spring pack movement device 54 which operates in a manner described in the Charbonneau's 649 Patent; the specification of that patent having been incorporated herein by reference. The signal created by the LVDT of the spring pack movement measuring device 54 is conveyed to the signal conditioner 59 and subsequently delivered to the device 60 for display in the form of a meter reading, load/time trace or other user observable format. By observation of the display device 60 signal, the user verifies that the simulated load has reached the desired value.

e. In the embodiment of FIG. 3, measurement of the simulated load is by the load cell 54'. The force signal generated at the load cell by force of the valve stem extension 56 and piston rod 47 is conveyed to the signal conditioner 59. The output signal is read by the user at the display device 60 in the form of a meter reading or a generated curve such as a load/time curve. By observation of the display device signal, the user verifies that the simulated load has reached the desired value.

f. Once the desired simulated load is achieved, the simulated load is sustained for a sufficient time to stabilize the motor parameters at the given operator load.

g. The power parameter transducer 75 is connected (or was previously connected) to the master control terminals 89 and to the current transducer 79 in the master control center 90, as previously described. In accordance with the present invention, the user connects the power parameter transducer 75 so as to generate from the power parameter transducer an output as to either the motor power or the motor power factor. Either of these parameters may be monitored by the user within the scope of the present invention. Both of these power parameters vary directly with the stem load (and simulated load). The output of the power parameter transducer 75 is provided through the signal conditioner 83 and display device 84 in the form of a meter reading, power parameter/time curve or other user observable manner. It is within the scope of the present invention to provide a power parameter versus thrust load curve by inputting the respective output from the load measuring device 54, and the power parameter transducer 75 to the same, appropriately receptive signal conditioner and recording device.

h. The value of the measured power parameter of the operator at the sustained, desired simulated load on the operator is now noted. This is the control value of the power parameter.

4. Through the above described calibration steps, the user has now determined a control value for the power parameter, either motor power or power factor. This control value for the power parameter corresponds with the maximum thrust load which the user will tolerate to build up within the valve operator 16 prior to the time that the valve gate 26 has fully opened or fully closed.

5. The valve operator 16 is returned to service by removal of the dynamic load simulator 40, load cell 54 and/or spring pack movement monitoring device 54. The system apparatus 10 of the present invention is now no longer in the calibration mode (see FIG. 1 and 3) but is now in the monitoring mode (see FIG. 2). In the monitoring mode, in accordance with the present invention, the power parameter transducer 75 remains connected, preferably in its non-intrusive manner as discussed above, to the power terminals 89 or 73. The output from the power parameter transducer 75 is conveyed by appropriate signal conveying cable to its signal conditioner 83 and then to the display device 84, i.e. meter or oscilloscope.

6. The user monitors the power parameter (motor power and/or motor power factor) on a periodic basis at the master control center 90 or, in certain embodiments, at the valve operator 16.

7. When and if the actual value of the monitored power parameter is observed to equal or exceed the control value, the user may be alerted, either by mental association or by a physical alarm that there is a possibility that the thrust now available to the operator is insufficient to successfully open or close the valve gate 26. At this point, the user should know to investigate the valve to determine if there is, indeed, a condition which requires repair, maintenance or replacement of the valve. Although a physical alarm is not a required component of the present invention, alternate embodiments of the invention include a buzzer alarm or other audible signal. In preferred embodiments, the recording device located at the remote master control center is a device which provides a printed, time related record of the monitored parameter to allow for scanning by the user of the parameter condition over a period of time.

Figure 2:
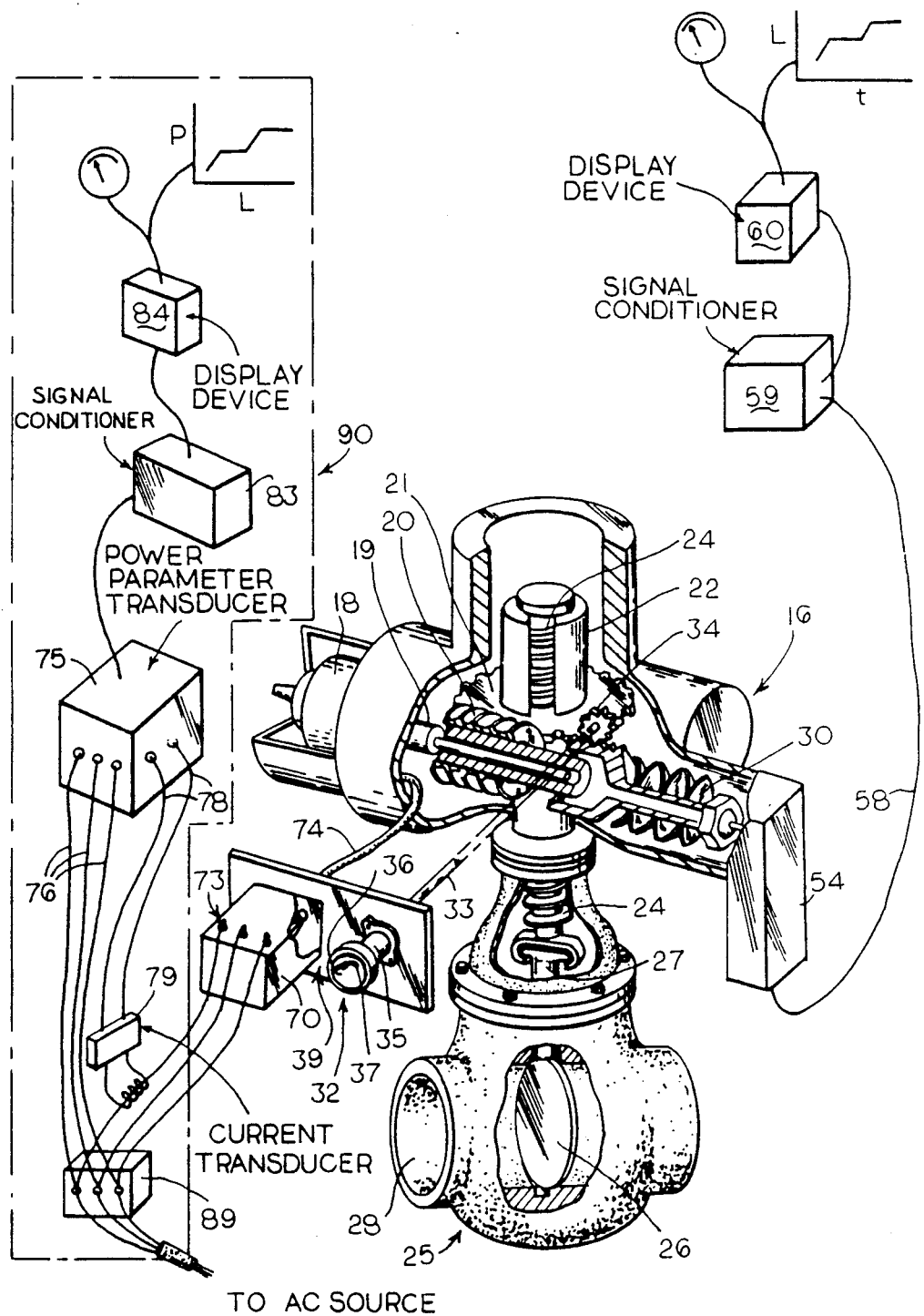
FIG. 2 is a pictorial representation of the Valve Operator Remote Monitoring System of FIG. 1 shown in the valve-in-use monitoring mode.

In the preferred embodiments of the present invention, the power parameter measurements, during both the calibration mode (control value) and the valve-in-use monitoring mode (actual value) are taken from the same terminal block. As seen in FIGS. 1 and 2, that terminal block is preferably the master control terminal 89. However, in some embodiments, the common terminal block is the operator terminal 73.

In other alternate embodiments, the control value determined during the calibration mode is taken at the valve power terminal assembly 70 (see FIG. 3), while the actual values measured during the valve-in-use monitoring mode are still taken at the remote control center terminal 89.

Whereas, the present invention is described with particular reference to AC Powered valve operators, it is within the scope of the invention to monitor DC powered valve operators. In such DC embodiments, the monitored power parameter is motor power only.

Whereas this invention has been described in detail with particular reference to preferred embodiments thereof, it would be understood that variations and modifications can be effected within the spirit and scope of the invention, as described herein before and as defined in the appended claims.

We claim:

1. Method of monitoring the condition of a valve and valve operator to signal a need for maintenance of the valve or valve operator, said method comprising the steps of:
determining a minimum thrust, defined as a thrust value which the user will consider as an unacceptably low available thrust in the valve operator;
determining a maximum thrust deliverable by the valve operator before operator motor shut down;
establishing a control value of a power parameter which corresponds to a stem thrust which is of a value equal to the difference between the above determined maximum thrust and minimum thrust;
monitoring the power parameter while the valve operator is in use to acquire actual monitored values of the power parameter;
comparing the monitored values to the control value; and
determining that a potential problem exist with the valve or valve operator if the monitored value exceeds the control value of the power parameter.

2. Method of claim 1, wherein thrust value considered as the unacceptably low thrust value in the step of determining a minimum thrust is a thrust value which the user considers to be a minimum thrust which the operator must have available to open or close the valve.

3. Method of claim 1, wherein the step of determining a minimum thrust comprises the steps of calculating the thrust required to overcome the maximum pressure differential of the valve and then increase that calculated thrust by a margin of safety.

4. Method of claim 1, wherein the step of determining a maximum thrust deliverable comprises the steps of: setting a torque switch associated with the valve operator; imposing a load on the valve stem to develop an increasing torque in the operator; measuring the thrust on the valve stem while the torque increases; and noting the thrust, being the maximum thrust, at the point that the torque switch is tripped and shuts down the operator motor.

5. Method of claim 1, wherein the step of establishing a control value of the power parameter comprises the steps of: imposing a load in the valve operator during a calibration period to generate a control thrust equal to the difference between the determined maximum thrust and the determined minimum thrust; and measuring a power parameter associated with the valve operator in response to the operator having generated the control thrust, this being the control value of the power parameter.

* * * * *